Jan. 4, 1927.  1,613,220
W. S. BROWN
AUTOMOBILE INHALER
Filed July 31, 1925    2 Sheets-Sheet 1

Winfield S. Brown, Inventor

By Richard B. Owen.

Witnesses
C. C. Churchman Jr.

Attorney

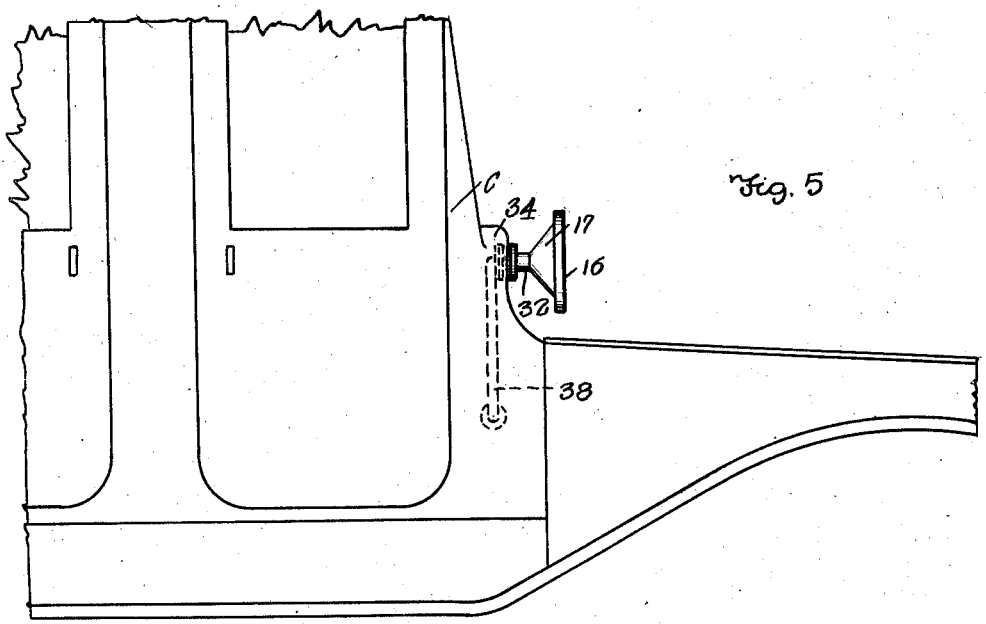
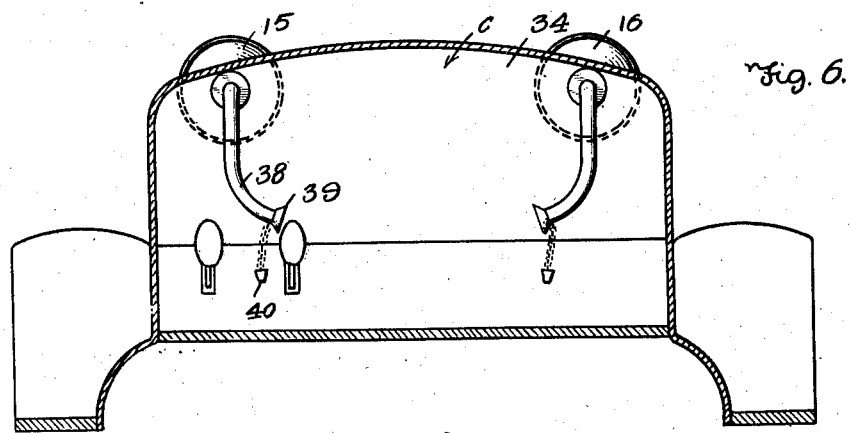
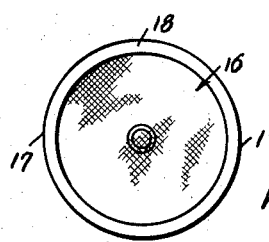

Patented Jan. 4, 1927.

1,613,220

UNITED STATES PATENT OFFICE.

WINFIELD S. BROWN, OF WASHINGTON, DISTRICT OF COLUMBIA.

AUTOMOBILE INHALER.

Application filed July 31, 1925. Serial No. 47,329.

This invention appertains to an attachment for motor vehicles and the primary object of the invention is to provide novel means for ventilating the foot boards of an automobile, so as to protect the user of the automobile against the heat of the engine.

Another object of the invention is the provision of a novel attachment for automobiles located on the opposite sides thereof embodying means for catching and collecting air while the vehicle is in motion and for directing the air directly against the foot boards of the vehicle so as to create a draft of fresh air across the same.

A further object of the invention is to provide novel means for connecting the novel attachment to different types of automobiles, so that the same can be effectively used both for open type of vehicles as well as closed types of vehicles.

A further object of the invention is to provide novel means for rendering the attachment inoperative during the winter seasons, so as to prevent the delivering of a cold blast of air to the interior of the car.

A still further object of the invention is to provide a novel ventilator for automobiles of the above character, which will be durable and efficient in use, one that will be simple and easy to manufacture and one which can be placed upon the market and incorporated with the vehicle at a small cost and which will add to rather than detract from the appearence thereof.

Figure 1:
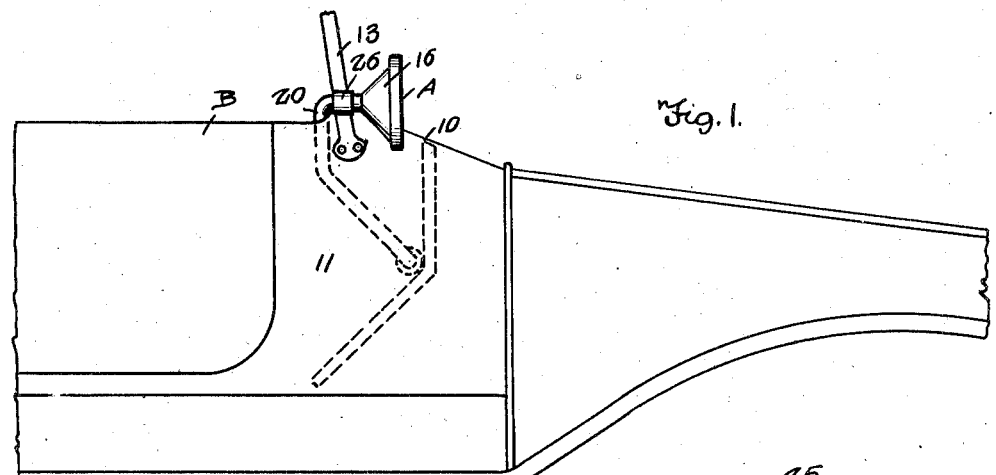

With these and other objects in view, the invention consists in the novel construction, arrangement and formation of parts, as will be hereinafter more specifically described, claimed, and illustrated in the accompanying drawings, in which drawings:

Figure 1 is a side elevation of the improved attachment showing the same applied to an automobile of the open type.

Figure 2:
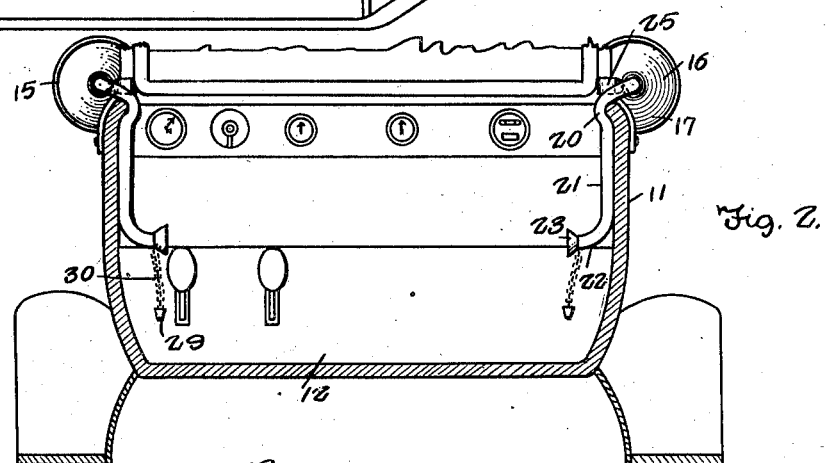
Figure 8:
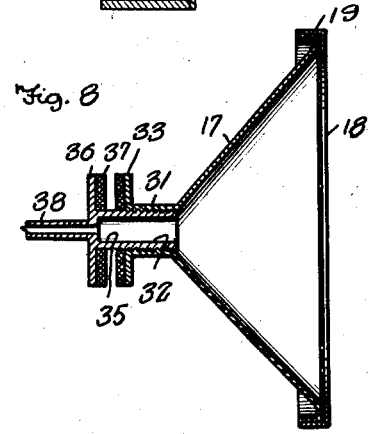
Figure 3:
Figure 4:
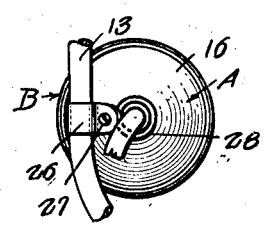

Figure 2 is a transverse section through the automobile taken on the line 2—2 of Figure 1 looking in the direction of the arrows, showing the novel attachment incorporated therewith, Figure 3 is a detail plan view of one of the brackets utilized for connecting one of the ventilators in place, Figure 4 is a rear elevation of one of the ventilators showing the same attached to one of the windshield standards, Figure 5 is a fragmentary side elevation of an automobile of the closed type showing the improved ventilator incorporated therewith, Figure 6 is a transverse section through a vehicle of the closed type showing the ventilators incorporated therewith, Figure 7 is a front elevation of one of the novel ventilators, Figure 8 is a central longitudinal section through one of the ventilators of the type which is adapted to be associated with a vehicle of the closed type, Referring to the drawings in detail, wherein similar reference characters designate corresponding parts throughout the several views, the letter A generally indicates the improved ventilator for a motor vehicle B, which as shown is of the open type. The vehicle B can be considered as a touring car and embodies the usual cowl 10, side walls 11, the foot boards 12, and the windshield standards 13. In all respects, the vehicle B is of the conventional type.

The novel ventilator A for the vehicle B embodies identically formed members 15 and 16 arranged respectively on the right and left hand sides of the automobile at the cowl thereof. Each of these members 15 and 16 include a funnel or hollow cone shaped air collector 17 which can be made of sheet metal if desired. The air collectors 17 are arranged with the enlarged ends facing the front of the vehicle and have arranged over the same insect excluding screens 18, which can be retained in position by the use of a suitable ring or the like 19. The rear ends of the air collectors 17 have secured thereto at their axial centers rearwardly and inwardly extending air conducting pipes 20, which are shaped to conform to the configuration of the vehicle, with which the same are associated. As shown the air conducting pipes 20 are provided with a bend, so as to engage about the rail or upper edge of the side walls 11 of the vehicle. Each of the air conducting pipes 20 are provided with depending extensions 21 extending down toward the floor board of the vehicle adjacent with the inner faces of the side walls 11 of the vehicle. The extensions 21 terminate in inwardly directed portions 22 which support the air distributing nozzles 23, which can also be of a cone shape. The novel ventilator members 15 and 16 can be secured in position in any desired way, and as shown in Figures 1 to 4 inclusive I provide brackets 25 for this purpose. These brackets 25 include companion jaw members 26 for gripping contact with the standards 13 of the windshield and the jaws are maintained in clamping position with the windshield standards by the use of a suitable bolt 27. The jaw members 26 carry right angularly disposed semi-circular sleeves 28 for gripping engagement with the air conducting pipes 20 as clearly shown in Figures 1 and 4.

It can be seen that when the vehicle is in motion, that the cones 17 will collect the air and direct the same downward to the air distributing pipe 21 and deliver the same to the nozzle 23, which will deliver a blast of fresh air across the foot boards.

Owing to the position of the cones 15 and 16, the fresh air will be directed across the foot boards from the opposite sides thereof.

In the winter season, when it is not desired to use the ventilator, it is merely necessary to place suitable stoppers 29 in the nozzles 23 and in order to prevent loss of the stoppers 29 the same can be connected to the nozzles by means of flexible chains 30 or the like.

In Figures 5 to 8 inclusive I have shown the ventilators applied to a vehicle B of the closed type and the ventilators in this form are substantially the same construction as that shown in the previous form, the difference residing more particularly in the novel means for connecting the air collectors 15 and 16 in position. The air collectors 15 and 16 in this form of the invention are provided with rearwardly extending tubular sleeves 31 which are formed directly on the funnels or cones 17 and these sleeves are provided with internal threads 32 for a purpose, which will be hereinafter more fully described. The rear ends of the sleeves 31 terminate in flanges 33 which are adapted to engage the front face of the cowl 34 of the vehicle C. The cowl of the vehicle in accordance with this invention is provided with openings on each side thereof for the receptacle of externally threaded nipples 35 which are threaded into threaded sleeves 31. These nipples 35 carry flanges 36 for engaging the inner face of the cowl. If preferred, the inner faces of the flanges 33 and 36 can carry compressible gaskets 37 for engaging the opposite faces of the cowl and it can be seen that by threading the nipples into the sleeves, that the air collectors can be firmly clamped in position. The nipples 35 carry the air conducting pipes 38 which extend into the vehicle toward the floor boards as clearly shown in Figure 6 of the drawings.

These pipes 38 end in air distributing nozzles 39 and these nozzles can be closed by the use of suitable stoppers 40 when desired.

From the foregoing description, it can be seen that I have provided novel means for effectively ventilating the interior of the vehicle at the floor boards thereof so as to prevent any discomfort from the heat of the engine to the users of the vehicle.

The device is so formed as to present an attractive appearance and the air collectors 17 simulate somewhat the appearance of ordinary vehicle lights.

Changes in details may be made without departing from the spirit or scope of this invention, but:

What I claim as new is:

1. The combination with an automobile including a body, foot boards and windshield standards, of a ventilator for the vehicle including like members arranged on each side thereof, each of said members embodying a hollow cone shaped air collector, an insect excluding screen arranged in the front of each collector, means for holding the screen in position, and inwardly and downwardly directed air conductor pipes communicating with the rear end of each air collector at the axial center thereof, the air conducting pipes extending into the vehicle and terminating in inwardly directed extensions, air distributing nozzles carried by said extensions and arranged adjacent to the foot boards of the vehicle, and removable stoppers for the nozzles and means for connecting the members in position on the vehicle including brackets carried by the air conducting pipes for detachably engaging the windshield standards.

2. The combination with an automobile including a body and foot boards, of a ventilator for the vehicle including like members arranged on each side thereof, each of said members embodying a hollow cone shaped air collector, an insect excluding screen arranged in the front of each collector, means for holding the screen in position, inwardly and downwardly directed air conductor pipes communicating with the rear end of each air collector and the axial center thereof, the air conducting pipes extending into the vehicle and terminating in inwardly directed extensions, air distributing nozzles carried by said extensions and arranged adjacent to the foot boards of the vehicle at opposite sides thereof, and means for holding the members in position on the vehicle.

In testimony whereof I affix my signature.

WINFIELD S. BROWN.